US008870373B2

(12) United States Patent
Aoyama et al.

(10) Patent No.: US 8,870,373 B2
(45) Date of Patent: Oct. 28, 2014

(54) SINGLE-LENS TYPE POLARIZING GLASSES

(75) Inventors: Naoya Aoyama, Osaka (JP); Koichiro Oka, Osaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 766 days.

(21) Appl. No.: 13/029,495

(22) Filed: Feb. 17, 2011

(65) Prior Publication Data
US 2011/0211154 A1 Sep. 1, 2011

(30) Foreign Application Priority Data

Feb. 26, 2010 (JP) ................................ 2010-042620

(51) Int. Cl.
G02C 7/12 (2006.01)
G02B 5/30 (2006.01)
G02B 27/26 (2006.01)

(52) U.S. Cl.
CPC *G02B 27/26* (2013.01); *G02C 7/12* (2013.01); *G02B 5/3033* (2013.01)
USPC ........................................ 351/159.56; 351/49

(58) Field of Classification Search
CPC ......... G02C 7/12; G02B 5/3033; G02B 27/26
USPC ................ 351/44–47, 159.6, 159.61, 159.62, 351/159.63, 159.64, 159.65, 49, 159.56
See application file for complete search history.

(56) References Cited

U.S. PATENT DOCUMENTS

| 4,741,611 | A | 5/1988 | Burns | |
|---|---|---|---|---|
| 5,825,455 | A | 10/1998 | Fecteau et al. | |
| 6,241,352 | B1 * | 6/2001 | Metcalfe | 351/47 |
| 6,793,339 | B1 * | 9/2004 | Yip et al. | 351/159.62 |
| 8,246,165 | B2 * | 8/2012 | Hadehara | 351/86 |
| 2002/0044352 | A1 | 4/2002 | Yamamoto et al. | |
| 2002/0149739 | A1 * | 10/2002 | Perrott et al. | 351/159 |
| 2006/0274259 | A1 | 12/2006 | Posin et al. | |
| 2008/0278676 | A1 | 11/2008 | Croft | |

FOREIGN PATENT DOCUMENTS

| DE | 3346627 | 7/1985 |
|---|---|---|
| EP | 1394595 | 3/2004 |
| JP | 1134419 | 5/1989 |
| JP | 2002-090529 | 3/2002 |
| JP | 2004-104371 | 4/2004 |

(Continued)

OTHER PUBLICATIONS

European Search Report, Application No. 1113817.9, dated Jan. 6, 2012.

(Continued)

*Primary Examiner* — Scott J Sugarman
(74) *Attorney, Agent, or Firm* — Posz Law Group, PLC

(57) ABSTRACT

An object of the present invention is to provide single-lens type polarizing glasses which are optically sufficient in performance, and are rich in variety from a view point of design. Both of a polarizer of a right eye lens and a polarizer of a left eye lens can be two independent polarizing plates, both sides of which are protected with protective sheets, respective polarizing plates are bending-processed into a spherical, non-spherical or toric shape, and a backup resin is thermally adhered on the protective sheet on a concave side of the bending-processed polarizing plate to make a single-lens type polarizing lens, which is further prepared into single-lens type polarizing glasses.

13 Claims, 2 Drawing Sheets

(56) References Cited

FOREIGN PATENT DOCUMENTS

| JP | 2004-237649 | 8/2004 |
| JP | 2006-301553 | 11/2006 |
| WO | 2008106868 | 9/2008 |
| WO | WO2009054835 | 4/2009 |

OTHER PUBLICATIONS

Japanese Office Action dated May 21, 2013, issued in corresponding Japanese Application No. 2010-042620.
Partial EP Search Report from Application No. 11153817.9 dated Jun. 9, 2011.

* cited by examiner

SINGLE-LENS TYPE POLARIZING GLASSES

TECHNICAL FIELD

The present invention relates to single-lens type polarizing glasses in which a polarizer is separated into a right eye lens and a left eye lens.

Since not only the single-lens type polarizing glasses are useful as an equipment for protecting eyes, but also a curve can be freely designed for each lens, a single-lens type polarizing lens can be made based on the same curve design as that for making a twin-lens type polarizing lens, and can be preferably used routinely, or in sports, as polarizing glasses having small visual sense distortion, or as outdoor sunglasses.

BACKGROUND

As an anti-glare strategy for cutting reflected light from a water surface, polarizing glasses with polarizing lenses fitted therein has been previously used.

Polarizing performance of the polarizing lens depends on a polarizer. The polarizer is generally a stretched sheet of polyvinyl alcohol having a thickness of 100 μm or less, and the same sheet is dyed with iodine or a dichroic dye to enhance a polarization degree.

However, since the polyvinyl alcohol-based polarizer is a sheet which is weak in physical strength, is poor in hygroscopicity resistance, and is flimsy, it is difficult to make a lens with only the polarizer, and it is said that anti-glare glasses having high practicality are obtained with difficulty.

For this reason, the polarizer is held between resin sheets or glass substrates to physically reinforce it, and an environmental measure of change in humidity is taken to obtain a lens, which is fitted in a glasses frame to obtain polarizing glasses.

A general form of the polarizing glasses is twin-lens type polarizing glasses in which a right eye lens and a left eye lens are independent. The twin-lens type glasses are made by placing separately made polarizing lenses into a twin-lens glasses frame.

To the contrary, single-lens type polarizing glasses have been also made. A laminate structure in which a polarizer is held between resin sheets is called a polarizing plate (See e.g. JP-A No. 1-22538) and, for example, when polycarbonate is used as a resin sheet, it is called polycarbonate polarizing plate.

When this polycarbonate polarizing plate is punched into a single-lens shape, and this is bending-processed into a cylindrical (toric) shape along a facial surface, or a polycarbonate resin is injection-molded as a backup resin on a concave side of the bending-processed polarizing plate, a single-lens type polarizing lens can be made.

When the finished single-lens type polarizing lens is trimming-polished, if necessary, and a nose pad and a glasses frame are mounted, single-lens polarizing glasses can be made (This is present as a commercially available product).

SUMMARY

Problems to be Solved by the Invention

The single-lens type polarizing glasses have a characteristic design which is impossible in the twin-lens type becomes possible.

On the other hand, since in a polycarbonate polarizing plate, a polarizer is easily cracked, bending-processing of a complicated shape is difficult. For example, it is considerably difficult to make a whole into a toric shape, and form only right eye and left eye parts into independent high curve lens spherical shapes, respectively.

For this reason, it is normal that the single-lens type polarizing glasses have a monoaxial cylindrical shape in conformity with a facial surface, and since as a visual line extends to an upper, lower, left or right end of a lens, objects appears distorted and performance is not optically sufficient in some cases. Alternatively, there was a problem that only polarizing glasses having small design variety can be made.

Means to Solve the Problems

In order to solve the aforementioned problems, the following means were invented.

First, single-lens type polarizing glasses, characterized in that a polarizer is separated into a right eye lens and a left eye lens, and the right eye lens and the left eye lens have lens curves which are independent from each other are disclosed.

Further, the single-lens type polarizing glasses, wherein both of the right eye lens and the left eye lens are independent spherical lenses, or nonspherical lenses, or toric lenses are disclosed.

Further, the single-lens type polarizing glasses, wherein both of the right eye lens and the left eye lens are independent biaxial toric lenses are disclosed.

Further, the single-lens type polarizing glasses, wherein both of the right eye lens and the left eye lens are biaxial toric lenses having a toric axis in a horizontal direction and a vertical direction, and both lenses having the same toric curve in a horizontal direction and, at the same time, having the same toric curve in a vertical direction are disclosed.

Further, the single-lens type polarizing glasses, wherein a toric curve in a horizontal direction is 6 to 11C, and a toric curve in a vertical direction is 2 to 8C are disclosed.

Further, the single-lens type polarizing glasses, wherein a toric curve in a horizontal direction is 8 to 10C, and a toric curve in a vertical direction is 4 to 6C are disclosed.

Further, the single-lens type polarizing glasses, wherein both of the polarizer of the right eye lens and the polarizer of the left eye lens constitute independent two polarizing plates, both sides of which are protected with protective sheets, and the protective sheet of one side of respective polarizing plates, and a backup resin are thermally adhered are disclosed.

Further, the single-lens type polarizing glasses, wherein both of the polarizer of the right eye lens and the polarizer of the left eye lens constitute two independent polarizing plates, both sides of which are protected with protective sheets, a resin sheet is laminated on the protective sheet of one side of respective polarizing plates, and the resin sheet and a backup resin are thermally adhered are disclosed.

Further, the single-lens type polarizing glasses, wherein both of the polarizer of the right eye lens and the polarizer of the left eye lens constitute independent two polarizing plates, both sides of which are protected with protective sheets, a coating layer having the adhering function is provided on the protective sheet of one side of respective polarizing plates, and the coating layer and a backup resin are adhered are disclosed.

Effect of the Invention

According to embodiments of the present invention, it has become possible to provide single-lens type polarizing glasses, in which a polarizer is separated into a right eye lens and a left eye lens, and the right eye lens and the left eye lens have lens curves which are independent from each other.

BRIEF DESCRIPTION OF THE DRAWINGS

FIG. 3(a) is a front view of the lens of FIG. 2, FIG. 3(b) is a top view of the lens of FIG. 3(a), and FIG. 3(c) is a side view of the left lens of FIG. 3(a) as seen from the left side of the left lens of FIG. 3(a).

MODE FOR CARRYING OUT THE INVENTION

Figure 1:
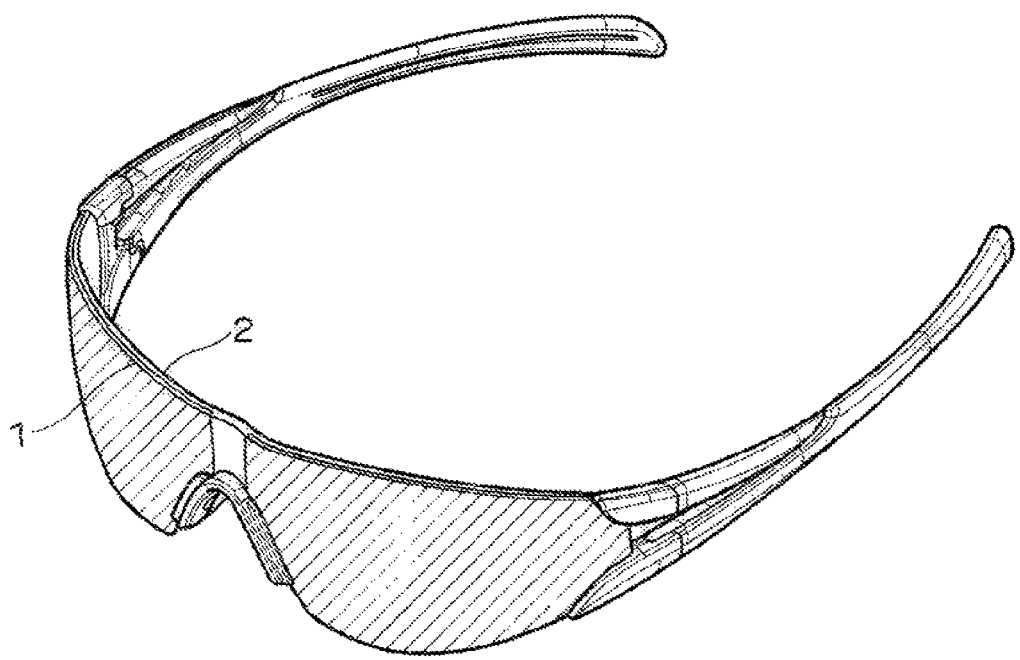
[FIG. 1] A perspective view showing single-lens type polarizing glasses of the present invention.

A polarizer used in the present invention is usually a uniform resin sheet having a thickness of 0.1 mm or less. Generally, the resin sheet is a monoaxially stretched sheet of a polyvinyl alcohol-based resin such as polyvinyl alcohol, polyvinyl acetal, and polyvinyl butyral.

In order to obtain a high polarization degree, a sheet is stretched at a stretching ratio of 2- to 5-fold and, further, is doped with iodine or a dichroic dye. It is possible to use a polarizer prepared by an iodine doping method or a dye doping method as the polarizer in the present invention.

The iodine doping method using iodine has the characteristic that it imparts little inherent coloration to the polarizer and easily affords a high polarization degree as compared with the dye doping method using a dye, which has a defect that the heat resistance is inferior due to use of iodine which is easily sublimated.

On the other hand, the dye doping method has a higher heat resistance, while there is a problem that a hue inherent to a dye appears in the polarizer. When a rear side (eye side) of a lens is backed up with a resin by an injection-molding method to obtain a lens, a polarizer doped with a dichroic dye having a high heat stability rather than iodine which is easily sublimated, is recommended.

The polarizer is generally weak in physical strength. In addition, a polarizer of a polyvinyl alcohol-based resin is hygroscopic, and is a substance which cannot be said to be generally good in its handling property.

For this reason, a polarizer reinforced by adhering a protective sheet thereto is called a polarizing plate, and a polarizing plate in place of a polarizer is a fundamental form of distribution and processing.

A fundamental structure of the polarizing plate is that a protective sheet is adhered to both sides of one polarizer, respectively. That is, this is a laminate having construction of three layers in which protective sheet—polarizer—protective sheet are laminated in this order.

The protective sheet is generally made by an extrusion-molding method or a cast-molding method.

As an extrusion-molded protective sheet, there is a thermoplastic resin sheet comprising a polycarbonate-based resin, a polyamide-based resin, a polyester-based resin, a polystyrene-based resin, an acryl-based resin comprising a polymer or a copolymer of methyl methacrylate and cyclohexyl methacrylate, a vinyl chloride-based resin, a polystyrene.methyl methacrylate-based resin, an acrylonitrile.styrene-based resin, a main chain hydrocarbon-based resin having poly-4-methylpentene-1, an adamantane ring or a cyclopentane ring on a main chain, a polyurethane-based resin, or a cellulose-based resin such as triacetylcellulose.

It is preferable that the protective sheet has optical anisotropy which is as small as possible, and is easily produced. For this object, a sheet obtained by monoaxially stretching at around 2- to 5-fold or biaxially stretching longitudinally and transversely at around 2- to 5-fold a polycarbonate-based resin, a polyamide-based resin, a polyester-based resin, or a polyurethane-based resin, which was extrusion-molded, is preferably used in the present invention.

As the polycarbonate-based resin, there are an aromatic polycarbonate resin having mainly phenols comprising an aromatic ring such as bisphenol A, an alicyclic polycarbonate resin, an aliphatic polycarbonate resin, or a polymer alloy of a polycarbonate resin and a polyester resin.

Among them, a polycarbonate resin having mainly phenols comprising an aromatic ring such as bisphenol A, and a polymer alloy of the polycarbonate resin and a polyester resin are preferable from a view point of retainment of a physical strength of a polarizing plate.

Particularly, a polycarbonate resin having a viscosity average molecular weight of 15000 or more, preferably 18000 or more is particularly recommended since it is excellent in strength and toughness, and has the high function of guarding a person wearing an equipment for protecting eyes from a blow.

As the polyurethane-based resin, among a polyurethane resin having aromatic isocyanate or alicyclic isocyanate as an isocyanate component, a polyurethane resin which has a hardness, a strength and strong toughness, hardly causes crystallization, and is highly transparent is preferable.

As the polyester-based resin, among a polyester resin having aromatic dicarboxylic acid such as terephthalic acid as a main component of dicarboxylic acid, a polyester resin which has a hardness, a strength and strong toughness, and is highly transparent is preferable.

As the polyamide-based resin, a polyamide resin which is polyamide obtained by polycondensing alicyclic or aliphatic dicarboxylic acid and alicyclic or aliphatic diamine, has a hardness, a strength and strong toughness, and is amorphous and highly transparent is preferable.

Since a protective sheet made by a cast-molding method has generally small optical anisotropy, it has a preferable property as a protective sheet of the polarizing plate, but it is generally produced with difficulty.

As the cast-molding method sheet, there is a sheet made by dissolving acylcellulose such as triacetylcellulose, diacetylcellulose, tripropylcellulose, and dipropylcellulose in, for example, acetone, casting a solution thereof on a belt or a flat plate, and heating or reduced pressure-treating this to perform desolvation.

In addition, for example, there is a sheet obtained by sealing (meth)acrylate containing mainly methyl methacrylate between glass plates, and cast-molding this by a so-called inter-plate polymerization method.

A protective sheet having a thickness of around 0.01 to 1.5 mm, preferably around 0.02 to 1.2 mm is used. When the thickness is less than 0.01 mm, preparation of the protective sheet itself becomes difficult. On the other hand, when the thickness exceeds 1.5 mm, there is a tendency that bending-processing of the polarizing plate becomes difficult.

The polarizing plate is generally such that a protective sheet is adhered on both sides of the polarizer in a form of holding the polarizer, using an adhesive or a pressure-sensitive adhesive.

Upon adhesion, in the case of a protective sheet by a cast-molding method, since optical anisotropy is small, there is a little problem, but directionality of the polarizer and the protective sheet becomes problematic.

That is, in the case of a protective sheet by an extrusion-molding method, unless a stretching direction of the polarizer and a stretching direction of the protective sheet are approximately completely consistent, a polarization degree is reduced, and a local variation of a polarization degree is generated. In the case of a biaxially stretched protective sheet, a stretching direction of a greater stretching ratio and a stretching direction of the polarizer are approximately completely consistent.

An adhesive or a pressure-sensitive adhesive for adhering the polarizer and the protective sheet needs long term durability to water, heat and light and, basically, is not particularly limited as far as it passes them.

Examples of an adhesive include an isocyanate-based resin, a polyurethane-based resin, a polythiourethane-based resin, an epoxy-based resin, a vinyl acetate-based resin, an acryl-based resin, and a wax-based resin. Examples of a pressure-sensitive adhesive include a vinyl acetate-based resin and an acryl-based resin.

Upon adhesion, the adhesive or the pressure-sensitive adhesive is uniformly coated on the protective sheet or the polarizer by a coating method such as a gravure coating method, or an offset coating method.

A thickness of the adhesive layer or the pressure-sensitive adhesive layer is usually 0.1 to 100 µm, preferably 0.5 to 80 µm. When a thickness of the adhesive layer or the pressure-sensitive adhesive layer is less than 0.1 µm, an adhering force is low and, when the thickness exceeds 100 µm, the adhesive or the pressure-sensitive adhesive is bled out from an edge face of the polarizing plate, in some cases.

A preferable thickness of the polarizer is 0.1 to 2 mm, preferably 0.2 to 1.2 mm.

The polarizing plate of less than 0.1 mm is made with difficulty and, when the thickness exceeds 2 mm, there is a tendency that, upon bending-processing of the polarizing plate described later, the polarizer is cracked, and the protective sheet is wrinkled, thus, there is a problem that the polarizer or the plate is not bent well into a lens.

A single-lens type polarizing lens used in the single-lens type polarizing glasses of the present invention is a lens in which curves of both of a right eye lens and a left eye lens are independent, and is obtained by arranging a polarizing plate on an object side, and injection-molding a backup resin on an eye side. The right eye lens and the left eye lens are spherical lenses, nonspherical lenses, or toric lenses, and left and right lenses are usually of the same curve, and have the same shape.

Generally, the polarizing plate has been processed into a front curve shape of a right eye lens and a left eye lens of the single-lens type polarizing glasses, or a shape close thereto, in advance.

For this reason, polarizing plates of the right eye lens and the left eye lens are bending-processed into any of a spherical shape, a nonspherical shape and a toric shape, in conformity with front curve shapes of the right eye lens and the left eye lens of the single-lens type polarizing glasses.

Among them, a biaxial toric shape is preferable because a lens is easily designed so that a visual line object is seen not distorted.

Further, a biaxial toric shape having toric axes in a horizontal direction and a vertical direction of glasses, respectively, is preferable.

In the case of a biaxial toric shape, it is preferable that toric curves in a horizontal direction of left and right lenses are the same and, at the same time, toric curves in a vertical direction of left and right lenses are the same.

Further, from a view point of proper visual sense layout and design of a lens, it is recommended that a toric curve in a horizontal direction is 6 to 11C, more preferably 8 to 10C, and a toric curve in a vertical direction is 2 to 8C, more preferably 4 to 6C.

Bending-processing is easily conducted when the polarizing plate is cut into small sheet pieces in advance. Generally, cut small sheet pieces are set in a mold having a spherical shape, or a nonspherical shape, or a toric shape, this is thermally pressed at a temperature of a glass transition temperature of a protective sheet or higher, or thermally shaped by reduced pressure-suction under environment at a glass transition temperature or higher.

A most preferable method of bending-processing the polarizer plate is a method of placing a cut polarizing plate on a mold heated at a glass transition temperature or higher of a protective sheet, adjusting an atmospheric temperature at a glass transition temperature of a protective sheet or higher, and reduced pressure-sucking space formed between the mold and the polarizing plate. This method does not generate cracks in the polarizer, does not produce wrinkles in the polarizing plate, and easily makes the polarizing plate bended just as a mold.

The single-lens type polarizing glasses of the present invention are made by injection-molding a backup resin on an eye side of the polarizing plate which was bending-processed as described above. A main object of backup is to reinforce an impact resistance strength of the single-lens type glasses.

Backup injection-molding is by a so-called insert injection-molding method of inserting the polarizing plate which was bending-processed into a mold of an injection-molding machine, and injection-molding a backup resin on a back side which is to be a concave surface.

In this case, the polarizing plate which was bending-processed for a right eye is inserted into a position of a right eye lens of the mold, and the polarizing plate which was bending-processed for a left eye is inserted at a position of a left eye of the mold.

From productivity and accuracy, the insert injection-molding method shown in JP-A No. 11-245259 is basically preferable.

That is, this is a method of arranging the polarizing plate in which a thermally adhering side faces a backup side into a mold, and injection-molding a backup resin layer. Inter alia, since an injection compression-molding method adopts a method of injecting a resin into a mold at a low pressure and, thereafter, closing the mold at a high pressure to add a compressing force to the resin, molding distortion, or optical anisotropy due to local orientation of a resin molecule at molding is generated in a molded article with difficulty. In addition, since a resin can be cooled at a constant specific volume by controlling a mold compressing force which is uniformly applied to a resin, a molded-product having a high dimensional precision is obtained.

The polarizing plate for a right eye lens and the polarizing plate for a left eye lens are independent polarizing plates, and are not mutually connected polarizing plates. For this reason, a region where the polarizing plate is not present, that is, the polarizer is not present is necessarily formed between the right eye lens and the left eye lens of an injection-molded article after backup formation.

In order to enhance as high as possible a polarization degree of left and right lenses of the single-lens type polarizing glasses of the present invention, it is required that the polarizing plate is inserted into a mold so that a stretching direction of the polarizer and the protective sheet and a horizontal direction of the single-lens type polarizing glasses are consistent as much as possible.

Since it is preferable that a backup resin is thermally adhered with the polarizing plate, it is preferable that a resin used in the protective sheet of the polarizing plate and the backup resin are chemically cognatic.

That is, it is preferable that when the protective sheet is a polycarbonate-based resin, the backup resin is a polycarbonate-based resin, when the protective sheet is a polyamide-based resin, the backup resin is a polyamide-based resin, when the protective sheet is a polyester-based resin, the backup resin is a polyester-based resin, when the protective sheet is a polyurethane-based resin, the backup resin is a polyurethane-based resin and, when the protective sheet is an acryl-based resin, the backup resin is an acryl-based resin.

In addition, when the protective sheet or the backup resin is a polyurethane-based resin, there is thermal adherability with a resin which is different in chemical species, in some cases.

In addition, as another method, there is a method of adhering a resin sheet for thermal adhesion on the protective sheet of one side of the polarizing plate, and injection-molding the backup resin on that side.

For example, when a polyamide-based resin sheet is adhered on one side of a polycarbonate polarizing plate in which the protective sheet is polycarbonate, and a polyamide-based resin is backup-molded, the polarizing plate and the backup resin can be thermally adhered.

In addition, as another method, the polarizing plate and the backup resin can be adhered by coating an adhesive or a pressure-sensitive adhesive having the adhering function, for example, an adhesive or a pressure-sensitive adhesive such as a polyurethane-based resin, a polythiourethane-based resin, an epoxy-based resin, a vinyl acetate-based resin, or an acryl-based resin on the protective sheet, and injection-molding the backup resin on a coated surface.

Front curves of the right eye lens and the left eye lens of the single-lens type polarizing glasses of the present invention are approximately equal to a front curve of the bending-processed polarizing plate. A back curve is also approximately equal to a front curve. That is, the backup resin is injection-molded using the thus designed and processed mold.

It is recommended that a maximum thickness of a lens after backup molding is 0.7 mm or more and 3 mm or less, preferably 0.8 mm or more and 2.8 mm or less. When the thickness is less than 0.7 mm, insert injection-molding is difficult, and the effect of reinforcing an impact resistance strength become deficient easily. In addition, when the thickness exceeds 3 mm, there is a tendency that a lens becomes heavy, and appearance of glasses when prepared into the single-lens type polarizing glasses is not good.

The right eye lens and the left eye lens, when a thickness is the same over a whole region of a lens part, become so-called planolenses. In planolenses, as a thickness of a lens grows greater, and as a visual line goes to a lens end, a refracting power on a minus side becomes remarkable, and distortion of a visual sense is easily generated. As strategy therefor, it is designed that a center of spherical curves or toric curves of a front lens and a back lens is shifted, or a curvature radius is changed to gradually decrease a thickness towards a lens edge face, and a minus refracting power is preferably eliminated by imparting a refracting power on a plus side.

It is recommended to adjust the single-lens type polarizing glasses of the present invention such that a polarization degree is 50% or more, a visual light transmittance is 10 to 75%, inter alia, 15 to 70%.

When a polarization degree is less than 50%, the glare preventing effect is weakened and, when a visual light transmittance is less than 10%, the view field is too dark to become a disorder for behavior. In addition, when a visual light transmittance exceeds 75%, the glare alleviating effect is reduced. Practically, it is recommended that a polarization degree is 80% or more, preferably 95% or more.

It is said that a polarization degree is approximately determined by performance of the polarizer. A visual light transmittance can be controlled by a polarization degree of the polarizer and, additionally, can be complemented by a method of inclusion of a coloring material such as a dye, a pigment etc. in the protective sheet of the polarizing plate, the adhesive or the pressure-sensitive adhesive, or the backup resin, or staining the protective sheet of the polarizing plate, the adhesive or the pressure-sensitive adhesive, or the backup resin with a coloring material such as a dye, a pigment etc.

The single-lens type polarizing lens of the present invention backed up with a resin is single-lens type polarizing lens-like, in which the polarizer is separated into a right eye lens and a left eye lens, and a curve of the right eye lens and a curve of the left eye lens are independent.

In order to provide such single-lens polarizing lens as glasses, a glasses frame and a nose pad to be worn on a facial surface become necessary. In extremely rare cases, single-lens type polarizing glasses are finished at the same time with backup injection-molding by using a mold with a frame and a nose pad, but this is not general.

Generally, such the single-lens type polarizing lens is cut into a variety of lens shapes in conformity with design and function, and a frame and a nose pad are mounted to prepare into the single-lens type polarizing glasses of the present invention.

It is preferable that the single-lens type polarizing lens used in the single-lens type polarizing glasses of the present invention has a surface which was hard coating-processed. As the hard coating, any type of generally used hard coating can be used, such as silane-based, and epoxy-based thermosetting hard coating, and acryl-based and epoxy-based active ray curable-type hard coating.

Hard coating is usually imparted at a film thickness of around 0.5 to 15 μm, and hard coating-processing is performed on coating of a primer coating layer such as an acrylate-based resin and a urethane-based resin for the purpose of improving adherability etc., in some cases.

In addition, the single-lens type polarizing lens used in the single-lens type polarizing glasses of the present invention is preferably such that at least any side is reflection prevention-processed. Reflection prevention processing is usually performed by laminating an inorganic film of around 2 to 8 layers having different refractive indices between neighboring layers on hard coating at an optical film thickness by a vacuum deposition method, or laminating an organic film of around 1 to 3 layers at an optical film thickness by a wet method.

In addition, the single-lens type polarizing lens used in the single-lens type polarizing glasses of the present invention is preferably such that at least any side is antifogging-processed. Antifogging processing is performed by imparting a polyvinyl alcohol-based or polyvinyl pyrrolidone-based hydrophilic resin, or a surfactant at a film thickness of around 1 to 50 μm.

In addition, the single-lens type polarizing lens used in the single-lens type polarizing glasses of the present invention is preferably such that at least any side is antistaining-processed. Antistaining processing is usually performed by imparting a fluorine-based organic compound at a film thickness of an order of from a few tens nm to ten and a few μm by a vacuum deposition method or a wet method, for the purpose of preventing staining such as fingerprint staining of a reflection preventing film, and making stain easily wiped.

In addition, the single-lens type polarizing lens used in the single-lens type polarizing glasses of the present invention is preferably such that at least any side is mirror-processed. Mirror processing is generally performed by imparting a film of a metal such as aluminum, silver, gold, and platinum, or a film of metal oxide on hard coating by a vacuum deposition method.

EXAMPLES

Example 1

FIG. 1 shows Example 1 of the single-lens type polarizing glasses according to the present invention.

Figure 2:
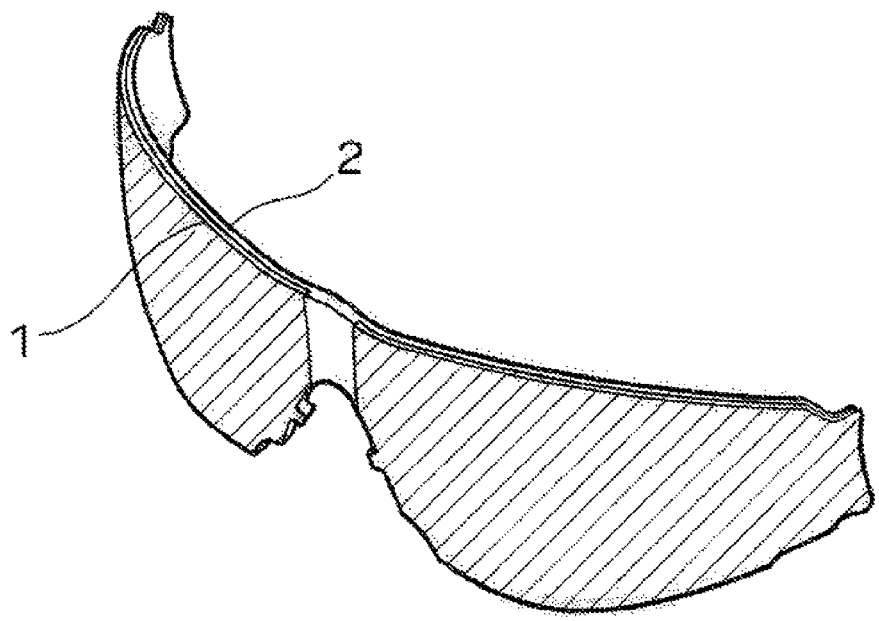
[FIG. 2] A perspective view showing a lens of the polarizing glasses of FIG. 1.

FIG. 2 shows a lens of the polarizing glasses. A region indicated by a diagonal line on the lens is a part of the polarizer. The polarizer is separated into a right eye lens and a left eye lens.

Respective polarizers have both sides protected with protective sheets, and constitute independent polarizing plates, and are prepared into a single-lens type polarizing lens by bending-processing respective polarizing plates into a toric shape, and thermally adhering a backup resin on a protective sheet on a concave side of the bending-processed polarizing plate to integrate them.

A method of thermal adhesion was performed by a procedure of inserting the bending-processed polarizing plate into a mold, and injection-molding a backup resin.

In the present Example 1, the protective sheet on both sides of the polarizer having a thickness of about 30 μm is polycarbonate having a thickness of about 400 μm, and the backup resin having a maximum thickness of 1.2 mm is also polycarbonate.

Figure 3:
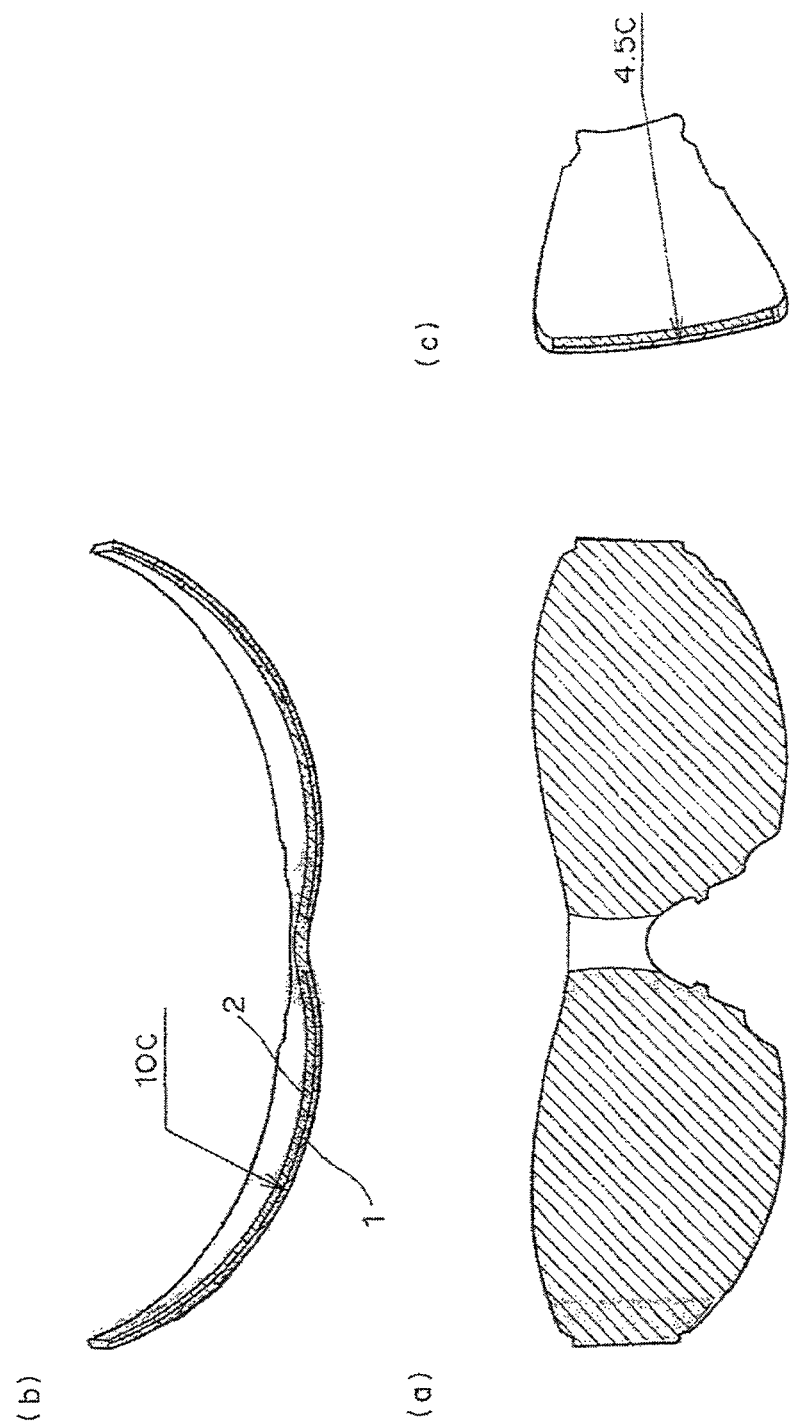
[FIG. 3]

FIG. 3 shows a detailed view of the lens.

1 in the figures indicates a polarizing plate, and 2 indicates a backup resin.

The figures show that the right eye lens and the left eye lens are both independent biaxial toric lenses. A top view of the lens, as seen in FIG. 3(b) shows that a toric curve in a horizontal direction is 10C. In addition, a side view of the left lens of FIG. 3(a) as seen from the left side of the left lens of FIG. 3(a) shows that a toric curve in a vertical direction is 4.5C.

EXPLANATION OF SYMBOLS

1 Polarizing plate
2 Backup resin

What is claimed is:

1. Single-lens type polarizing glasses comprising:
a polarizer separated into a right eye lens and a left eye lens, the right eye lens and the left eye lens having independent lens curves, wherein
the right eye lens and the left eye lens are both independent spherical lenses, nonspherical lenses, or toric lenses, and both of the polarizer of the right eye lens and the polarizer of the left eye lens comprise two independent polarizing plates, both sides of which are protected with protective sheets, and a backup resin is thermally adhered to one side of respective polarizing plates.

2. The single-lens type polarizing glasses according to claim 1, wherein the right eye lens and the left eye lens are both independent biaxial toric lenses.

3. The single-lens type polarizing glasses according to claim 2, wherein the right eye lens and the left eye lens are both biaxial toric lenses having a toric axis in a horizontal direction and a vertical direction, and both lenses have the same toric curve in a horizontal direction and, at the same time, have the same toric curve in a vertical direction.

4. The single-lens type polarizing glasses according to claim 3, wherein a toric curve in a horizontal direction is 6 to 11C, and a toric curve in a vertical direction is 2 to 8C.

5. The single-lens type polarizing glasses according to claim 3, wherein a toric curve in a horizontal direction is 8 to 10C, and a toric curve in a vertical direction is 4 to 6C.

6. The single-lens type polarizing glasses according to claim 1, wherein further comprising a resin sheet which is laminated on the protective sheet of one side of respective polarizing plates, and the resin sheet and a backup resin are thermally adhered.

7. The single-lens type polarizing glasses according to claim 1, wherein further comprising a coating layer having the adhering function which is provided on the protective sheet of one side of respective polarizing plates, and the coating layer and a backup resin are adhered.

8. A lens configuration for polarized glasses, comprising:
a right eye lens including a first polarizing plate having a first curvature, a right eye object-side surface and a right eye eye-side surface;
a left eye lens including a second polarizing plate separate from the right eye lens and having a second curvature independent of the first curvature of the right eye lens, a left eye object-side surface and a left eye eye-side surface; and
a backup resin layer adhered to both the right eye eye-side surface of the right eye lens and the left eye eye-side surface of the left eye lens to integrate the right eye lens and the left eye lens into a single lens body,
wherein
the backup resin layer is thermally adhered to both the right eye eye-side of the right eye lens and the left eye eye-side of the left eye lens.

9. The lens configuration of claim 8, wherein
the first polarizing plate and the second polarizing plate are adhered to the object-side surfaces of the right eye lens and the left eye lens, respectively.

10. The lens configuration of claim 8, wherein
the first polarizing plate and the second polarizing plate each include an object-side
protective sheet and an eye-side protective sheet, and
the backup resin is adhered to the eye-side protective sheet of the first polarizing plate and the eye-side protective sheet of the second polarizing plate.

11. The lens configuration of claim 10, further comprising a coating layer that adheres the eye-side protective sheet of the first polarizing plate and the eye-side protective sheet of the second polarizing plate to the backup resin.

12. The lens configuration of claim 10, further comprising a resin sheet that adheres the eye-side protective sheet of the first polarizing plate and the eye-side protective sheet of the second polarizing plate to the backup resin.

13. The lens configuration of claim 8, wherein
the backup resin includes a bridge portion that is not adhered to either the eye-side
surface of the right eye lens or the eye-side surface of the left eye lens, but that connects respective portions of the backup resin that are thermally adhered to the eye-side surface of the right eye lens and the eye-side surface of the left eye lens.

* * * * *